United States Patent [19]

Anvari et al.

[11] Patent Number: 5,479,453

[45] Date of Patent: Dec. 26, 1995

[54] WIRELESS TELECOMMUNICATION DIGITAL RECEIVER

[75] Inventors: Kiomars Anvari, Walnut Creek; Ahmad S. Bahai, Albany; Saman Behtash, Berkeley; Peter Winship, Albany, all of Calif.

[73] Assignee: TSCI Corporation, Berkeley, Calif.

[21] Appl. No.: 174,820

[22] Filed: Dec. 29, 1993

[51] Int. Cl.$^6$ ............................... H04B 1/10; H04L 25/08
[52] U.S. Cl. ............................................. 375/348; 375/349
[58] Field of Search .................................... 375/78, 80, 83, 375/86, 94, 99, 100, 101, 102; 329/304; 455/137, 205

[56] References Cited

U.S. PATENT DOCUMENTS

| | | | |
|---|---|---|---|
| 4,584,534 | 4/1986 | Lijphart et al. | 375/83 |
| 4,873,683 | 10/1989 | Borth et al. | 375/101 |
| 5,214,390 | 5/1993 | Montreuil | 375/83 |
| 5,285,480 | 2/1994 | Chennakeshu et al. | 375/101 |

OTHER PUBLICATIONS

A. Higashi et al., NTT Radio Communication Systems Lab., "BER Performance of Mobile Equalizer Using RLS Algorithm in Selective Fading Environment".

S. Sampei, "Development of Japanese Adaptive Equalizing Technology Toward High Bit Rate Data Transmission in Land Mobile Communications", IEICE Transactions, vol. E 74, No. 6, Jun. 1991.

Y. Liu, "Bi-Directional Equalization Technique for TDMA Communication Systems over Land Mobile Radio Channels", pp. 1458–1462, Globecom '91.

Primary Examiner—Stephen Chin
Assistant Examiner—Don N. Vo
Attorney, Agent, or Firm—Ronald L. Yin; Limbach & Limbach

[57] ABSTRACT

A digital receiver for receiving an RF signal has a conventional RF to intermediate frequency (IF) converter. The IF signal, however, is amplified with a limit on its amplitude. In addition, a Receive Signal Strength Intensity (RSSI) signal is generated. The RSSI signal contains the envelope information of the modulated IF signal. The IF amplitude limited signal containing phase information, is then digitized and a complex baseband signal is produced. The complex baseband signal is then combined with the RSSI signal to restore the amplitude information of the modulated IF signal in the complex baseband signal. The restored complex baseband signal can be equalized with a conventional equalizer to remove intersymbol interference. A conventional symbol detector detects the symbol in this signal stream.

10 Claims, 5 Drawing Sheets

WIRELESS TELECOMMUNICATION DIGITAL RECEIVER

TECHNICAL FIELD

The present invention relates to a telecommunication receiver for receiving a wireless transmitted electromagnetic signal, and more particularly, to a method for receiving digital cellular signals.

BACKGROUND OF THE INVENTION

Wireless communication is well known in the art. Heretofore, one type of wireless communication is known as a "cellular" communication wherein each stationary unit receives and transmits signals to mobile units within its allocated geographical region, called a cell. As mobile units move from one cell to another, communication is transferred from one stationary unit in one cell to another stationary unit in another cell.

Heretofore, cellular communication is analog based and has risen in popularity. However, as a result, the airways have become increasingly crowded and the capacity of the communication system to take on new subscribers is becoming increasingly of a problem. Digital cellular communication offers an opportunity to increase the number of subscribers to operate within the cellular system.

One of the problems of a digital wireless communication system is the non-linearity of the channel. Another problem is the equalizing of the digitally encoded signals. As the digitally encoded signal is transmitted from one unit to another, through a multiplicity of data paths, the various signals arriving at the other unit can cause delay spread between the digitally encoded signals. This produces inter-symbol interference. An equalizer is a digital hardware/software apparatus which corrects inter-symbol interference between the digitally encoded signals arriving from a plurality of signal paths.

In the prior art, a number of equalization strategies is disclosed. See, for example, "BER Performances Of Mobile Radio Equalizer Using RLS Algorithm In Selective Fading Environment" by Akihiro Higashi, Hiroshi Suzuki; "Bi-Directional Equalization Technique For TDMA Communication Systems Over Land Mobile Radio Channels" by Yow-Jong, Liu, page 1458–1462, Globecom '91; and "Development Of Japanese Adaptive Equalization Technology Toward High Bit Rate Data Transmission In Land Mobile Communications" by Seiichi Sampei, page 1512–1521 IEICE Transactions, Volume E, 74, No. 6, June, 1991.

In a multi-path fading environment the signal arriving at a receiver is composed of several signals, each of which corresponds to the transmitted signal following a distinct path from the transmitter to the receiver. In a time varying channel, the multi-path combinations of the transmitted signal at the receiver produce a signal whose amplitude is time varying and experiences fading due to destructive combining of the received signals. For digital transmission, the multi-path fading of the channel results in substantially larger average values of the Bit Error Rate (BER) when compared to a non-faded channel operating at the same average Signal to Noise Ratio (SNR). Therefore, to achieve a given average BER value in a fading channel the required SNR value is substantially higher than that required in a non-faded channel.

In environments where the modulated carrier is subject to fast multi-path fading, conventional continuous time synchronization techniques cannot be performed satisfactorily. In time domain multiple access systems where each user is assigned one time slot the receiver has to perform its timing and frequency synchronization in a slot by slot basis. Frequency synchronization is usually achieved by automatic frequency control circuits which have some inherent frequency error. Therefore, the timing recovery circuit or algorithm has to accommodate some limited amount of frequency error without significant degradation in performance.

Heretofore, to reduce the effects of fading, i.e. to reduce the required SNR values for given BER targets, signal diversity at the receiver has been considered. A receiver is provided with two or more independently faded versions of the same transmitted signal. By so doing, the probability that all the faded signals suffer large attenuations simultaneously is reduced resulting in lower detection error probability.

Several timing recovery techniques have been disclosed in the prior art. They can be classified into four categories. In the first category the threshold crossings of the received baseband data signal are compared with the sampling phase. A correction of the sampling phase is initiated as a result of this comparison. The main location of the crossings is estimated and the optimum sampling instant is assumed to be halfway between these crossings. The second technique uses the spectral line at the clock frequency or multiple of this frequency. This frequency is filtered out with a narrow band filter. The third technique is the sample-derivative system. In this technique a sampled-derivation phase detector which generates an error signal during each symbol interval proportional to the time derivative of the signal at the sampling time multiplied by the signal polarity at that time is used. The sampling derivative timing recovery system attempts to set the sampling time to coincide with the peak of the signal. Finally, in the fourth technique, a bank of all pass filters is used as a timing phase detector. This technique is suitable for the signals whose frame structure contains a synchronization field.

Fast multipath fading severely degrades the average BER performance of digital land mobile radio transmission systems. In order to achieve highly reliable digital data transmission without excessively increasing both transmitter power and co-channel reuse distance, it is well known to use diversity reception.

A diversity technique requires a number of signal transmission paths, named diversity branches, all of which carry the same information but have uncorrelated multipath fadings, and a circuit to combine the received signals into one which can be decoded reliably. Depending upon the land mobile radio propagation characteristics, there are a number of methods to construct diversity branches. Generally, they are classified into the following five categories: (1) space, (2) angle, (3) polarization, (4) frequency, and (5) time diversity.

Space diversity, which has been the most widely used because it can be implemented simply and economically, comprises a single transmitting antenna and a number of receiving antennas. Space between adjacent receiving antennas is chosen so that multipath fading appearing in each diversity branch becomes uncorrelated with that of the other branch.

Summary of the Invention

A telecommunication receiver receives a wireless transmitted electromagnetic signal. The receiver comprises an antenna for receiving the wireless transmitted electromagnetic signal and for converting the same to a radio frequency (RF) signal. The RF signal is converted into an intermediate frequency (IF) signal having an amplitude and for limiting the amplitude, and for generating a receive signal strength intensity (RSSI) signal. A bandpass converting means receives the amplitude limited IF signal and the RSSI signal. The bandpass converting means comprises means for converting the amplitude limited IF signal to a plurality of baseband signals. Each of the plurality of baseband signals is digitized at a sampling rate to produce a plurality of digitized baseband signals. The plurality of digitized baseband signals are combined to produce a complex signal S(t) in accordance with $S(t)=I(t)+jQ(t)$ where $I^2(t)+Q^2(t)=$ constant, where I,Q are the plurality of digitized baseband signals. The RSSI signal is digitized to produce a digitized RSSI signal. The digitized RSSI signal is multiplied with the complex signal to produce a complex baseband signal. The complex baseband signal is equalized by removing intersymbol interference. Finally, signals are detected in the complex baseband signal.

In another embodiment, the bandpass converting means digitizes the amplitude limited IF signal at a first sampling rate. The digitized IF signal is converted into a plurality of digitized baseband signals and are combined to produce a complex signal as described heretofore. However, the RSSI signal is digitized at a second sampling rate, lower than the first sampling rate, to produce a digitized RSSI signal. The digitized RSSI signal is then multiplied with the complex signal to produce a complex baseband signal. The complex baseband signal is then equalized by removing intersymbol interference. The symbols are then detected in the complex baseband signal.

A method of detecting symbol signals in a wireless transmitted electromagnetic signal is also disclosed.

DETAILED DESCRIPTION OF THE DRAWINGS

Figure 1:
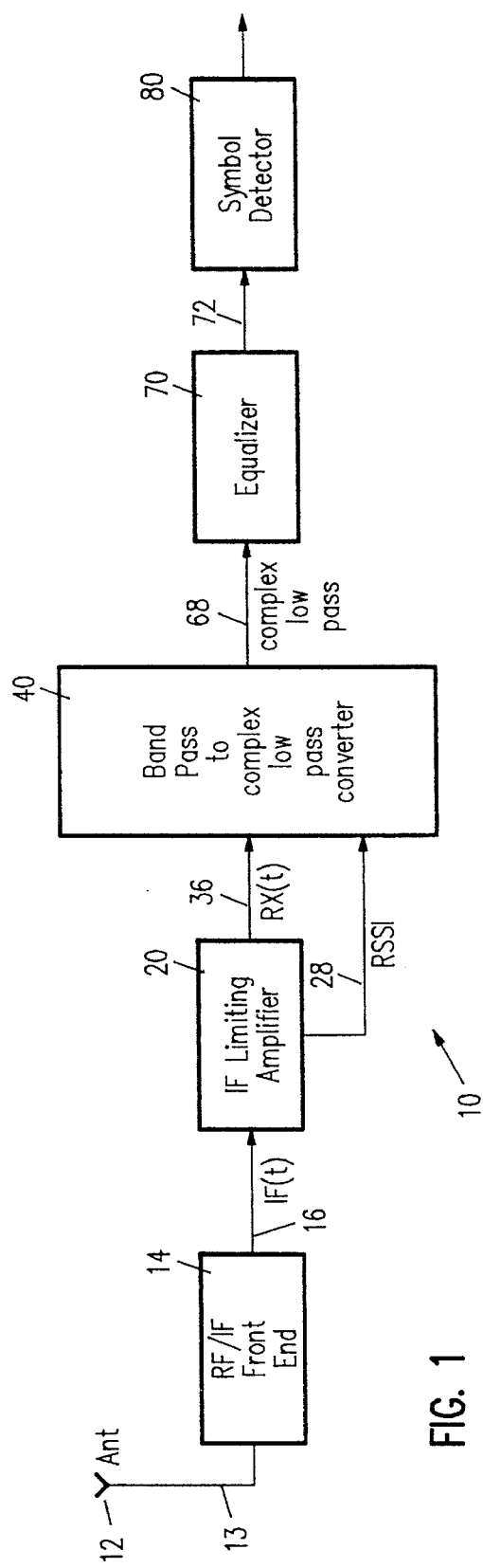
FIG. 1 is a block level diagram of one embodiment of a wireless digital receiver, having a single antenna, to receive the transmitted electromagnetic signal and using an equalizer to eliminate intersymbol interference.

Referring to FIG. 1 there is shown a schematic block level diagram of one embodiment of a digital receiver 10. In a wireless communication system between a mobile unit and a stationary unit, the digital receiver 10 can be a portion of a mobile unit or a portion of the stationary unit. More particularly, as will be appreciated by those having ordinary skill in the art, the stationary unit would comprise additional units to accomplish functions such as hands off and the ability to process many remote units at the same time. In the preferred embodiment, the digital receiver 10 receives wireless electromagnetic radiation signals in the radio frequency band to effectuate digital cellular communication.

The digital receiver 10 in the embodiment shown in FIG. 1, comprises a single antenna 12 which receives the RF (radio frequency) wireless signal 13. The RF signal 13 is then processed by an RF processing unit 14, which converts the RF signal 13 into an intermediate frequency (IF) signal 16. The RF processing unit 14 which converts the RF signal into an IF signal 16 is well known in the art.

The IF signal 16 is supplied to an amplifier 20 which generates an amplitude limited, amplified IF signal RX(t) 36. In addition, the amplifier 20 generates a receive signal strength intensity (RSSI(t)) signal 28, which also varies with time, because it follows the envelope of the received signal.

The amplitude limited RX(t) signal 36 and the RSSI signal 28 are passed to a bandpass to complex low pass converter 40. The converter 40 serves to receive the amplitude limited signal RX(t) 36 and the RSSI signal 28 and to convert them into a complex baseband signal 68.

The complex baseband signal 68 is supplied to an equalizer 70. The equalizer 70 removes intersymbol interference in the complex baseband signal 68 when the channel is experiencing delay dispersion. The output signal of the equalizer 70 after the intersymbol interferences are removed is then supplied to a symbol detector 80 for detecting the received symbols in the digital stream.

Figure 2:
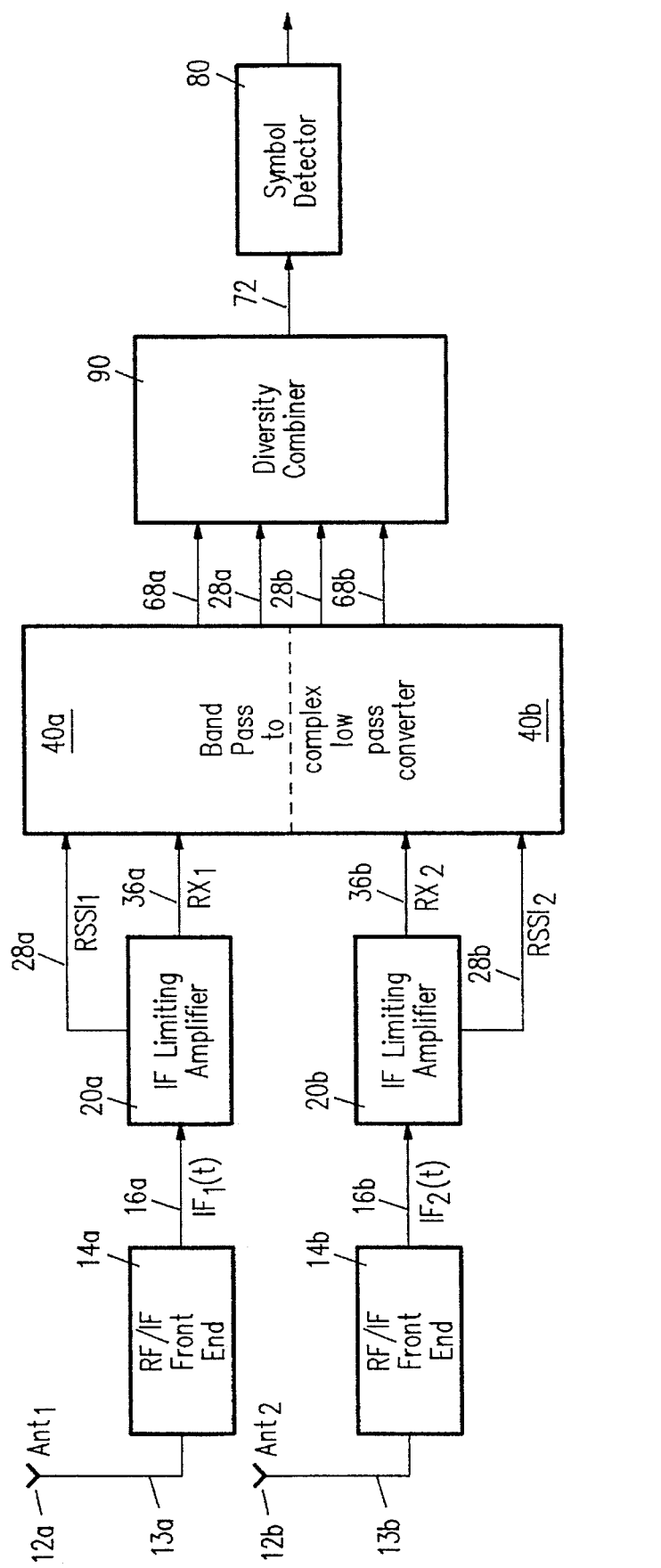
FIG. 2 is a block level diagram of another embodiment of a wireless digital receiver having a plurality of spaced-apart antennas to receive the transmitted electromagnetic signal and combining the processed signals to eliminate flat fading.

Referring to FIG. 2 there is shown another embodiment of a receiver 110. The receiver 110 shown in FIG. 2 is a space diversity receiver and is almost identical to the receiver shown in FIG. 1. The receiver 110 has a plurality of antennas (in this case two are used) to achieve space diversity. The plurality of spaced apart antennas 12a and 12b serve to detect simultaneously the RF transmitted signal. Thus, there are two signal channels for the processing of the two received RF signals 12a and 12b. In the first channel, a first antenna 12a receives the wireless transmitted signal and converts it into a first RF signal 13a. An RF processing unit 14a receives the first RF signal 13a and generates a first $IF_1(t)$ signal 16a in response. The first RF processing unit 14a is substantially identical to the RF processing unit 14 shown in FIG. 1 and is well known in the art.

The first $IF_1(t)$ signal 16a in the first channel is supplied to a first IF amplifier 20a which generates an amplitude limited amplified IF signal $RX_1(t)$ 36a, and a first $RSSI_1$ signal 28a. The first amplifier 20a is substantially similar to the amplifier 20 shown in FIG. 1. The first amplitude limited IF signal $RX_1(t)$ 36a and the first $RSSI_1$ signal 28a are supplied to a bandpass to complex low pass converter 40a. The bandpass to complex low pass converter 40a generates a first complex baseband signal 68a. The bandpass to complex low pass converter 40a is substantially identical to the bandpass to complex low pass converter 40 shown in FIG. 1.

In the second channel, the second antenna 12b receives the same electromagnetic signal in the radio frequency spectrum and converts it into a second RF signal 13b. The second RF signal 13b is supplied to a second RF processing unit 14b to generate a second IF$_2$(t) signal 16b.

The second IF signal IF$_2$(t) 16b in the second channel is supplied to a second IF amplifier 20b which generates a second amplitude limited amplified IF signal RX$_2$(t) 36b, and a second RSSI signal RSSI$_2$ 28b. The second amplifier 20b is substantially similar to the amplifier 20 shown in FIG. 1. The second amplitude limited IF signal RX$_2$(t) 36b and the second RSSI$_2$ signal 28b are supplied to a second channel of a bandpass to complex low pass converter 40b. The bandpass to complex low pass converter 40b generates a second complex baseband signal 68b. The bandpass to complex low pass converter 40b is substantially identical to the bandpass to complex low pass converter 40 shown in FIG. 1.

The first complex baseband signal 68a and the second complex baseband signal 68b are supplied to a diversity combiner 90. Since a plurality of spaced apart antennas are used to receive a plurality of RF signals 12a and 12b to achieve space diversity, the two channels of complex baseband signals 68a and 68b are combined by a diversity combiner 90 to generate a single output signal eliminating flat fading. This signal is then supplied to the symbol detector 80. The symbol detector 80 is substantially identical to the symbol detector 80 shown in FIG. 1. The symbol detector 80 detects the symbols from the digital signal supplied as input thereto.

Figure 3:
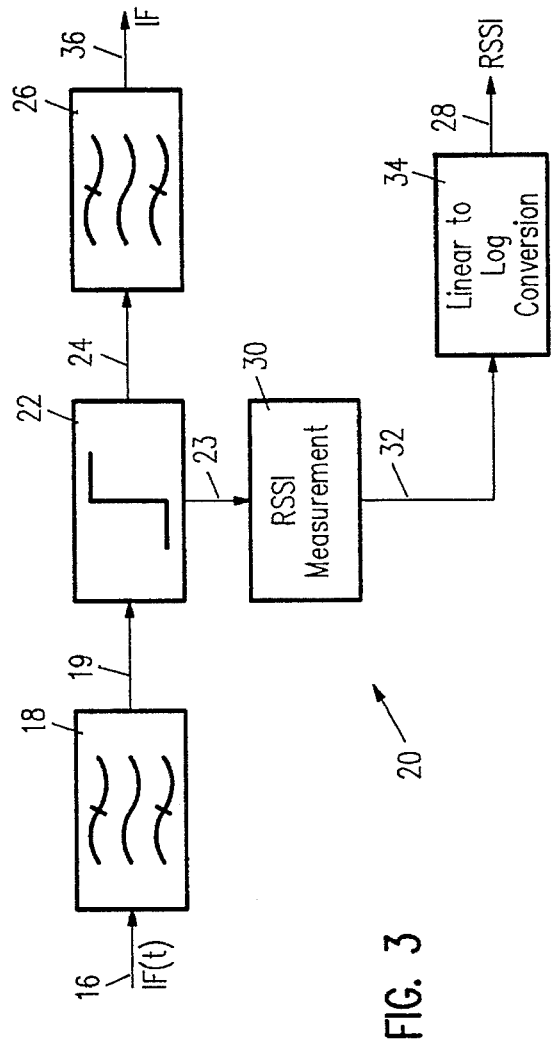
FIG. 3 is a block level diagram of an intermediate frequency (IF) amplitude limited amplifier which can be used in the receivers shown in FIGS. 1 and 2, to produce an amplitude limited IF signal and an RSSI signal.

Referring to FIG. 3 there is shown a block level diagram of the IF amplifier 20 used in the receiver 10 or 110. The IF limiting amplifier 20 receives the IF signal 16 and supplies it through a first bandpass filter 18. The first bandpass filter 18 provides match filtering for the IF signal 16 to minimize any intersymbol interference. It also provides the selectivity for rejecting any unwanted signal. The first bandpass filter 18 generates a first IF filtered signal 19.

The first IF filtered signal 19 is supplied to a limiting amplifier 22 which acts almost like an instant automatic gain control amplifier. The amplifier 22 removes any amplitude fluctuation in the first IF filtered signal 19 and produces an amplified IF signal 24 as its output. Mathematically, the amplified IF signal S$_2$(t) 24 is related to the first filtered IF signal S$_1$(t) 19 in the following manner:

$$S_2(t) = \frac{S_1(t)}{|S_1(t)|}$$

Thus, the amplified IF signal S$_2$(t) 24 is a vector signal with a constant magnitude and a phase that changes according to the input modulating IF filtered signal S$_1$(t) 19. The amplified IF signal 24 results in spectrum regrowth and spreading.

Finally, the amplified IF signal 24 is supplied to a band pass filter 26. The band pass filter 26 confines the IF signal 24 in a manageable bandwidth, depending on the number of samples used in the analog to digital converter 48a and 48b of FIG. 4 or A/D converter 148 and 48 of FIG. 5, as explained hereinafter.

The amplifier 22 also supplies an RSSI signal 23 which is supplied to an RSSI measurement circuit 30. The RSSI measurement circuit 30 generates an RSSI signal 32 which is proportional to the envelope of the IF signal 19 supplied to the amplifier 22. The RSSI signal 32 is then converted by a linear to log conversion circuit 34 into a log RSSI signal 28, to reduce the requirement for the dynamic range of the analog-to-digital converter 58, which is used to digitize the RSSI signal (as discussed hereinafter). The log RSSI signal 28 continues to maintain the envelope information of the IF signal 19 but in logarithmic format. In contrast, the amplitude limited IF amplified signal 36 will no longer have any envelope information.

Figure 4:
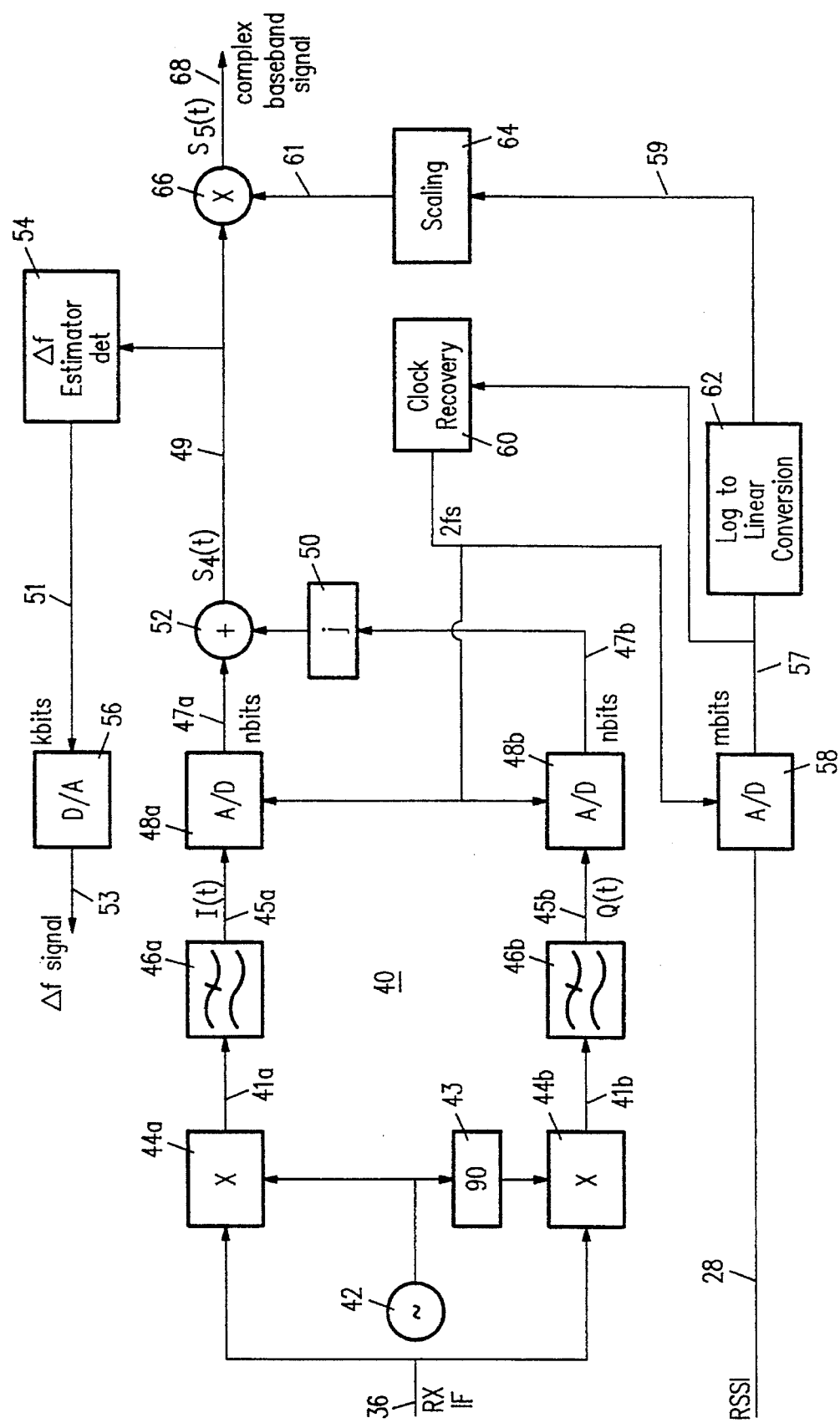
FIG. 4 is one embodiment of a bandpass to complex low pass converter which can be used in the receivers shown in FIGS. 1 and 2.

Referring to FIG. 4 there is shown one embodiment of the bandpass to complex low pass converter 40. The converter 40 shown in FIG. 4 is a quadrature demodulator which is used to convert the IF signal 36 to a complex baseband signal 68. The manner in which this is accomplished is as follows. The IF signal 36 is first demodulated. A carrier signal at the reference IF frequency is generated by a generator 42. The carrier signal is supplied to a first multiplier 44a to which the IF signal 36 is also supplied to demodulate the IF signal 36 to produce a first demodulated IF signal 41a. The first IF demodulated signal 41a is filtered by a first low pass filter 46a to produce a first real baseband signal I(t) 45a. The baseband signal I(t) 45a is then digitized by a first analog-to-digital digitizer 48a to produce a digitized I(t) signal 47a.

The IF signal 36 is also supplied to a second multiplier 44b. The carrier signal generating the reference IF frequency from the generator 42 has its phase shifted by 90° by phase shifter 43. The phase shifted carrier signal is then supplied to the second multiplier 44b which produces a second IF demodulated signal 41b, which is filtered by a low pass filter 46b to produce a filtered real baseband signal Q(t) 45b. The real baseband Q(t) signal 45b is then digitized by a second A/D converter 48b, sampling at the same sampling rate as that for the first A/D converter 48a, based upon a clock signal from the clock 60, to produce a digitized real Q signal 47b. Each of the real I and Q digitized signals 47a and 47b comprises a digital sample signal having n bits. The real Q digitized signal 47b is then multiplied by the imaginary vector j by multiplier 50. The signal is then supplied to an adder 52 which generates the complex baseband signal S$_4$(t) 49 which is:

$$S_4(t) = I(t) + jQ(t) \quad I^2(t) + Q^2(t) = \text{constant}$$

The complex signal 49 contains the phase of the IF signal 28 but does not carry any amplitude information. The complex signal 49 is then supplied to a frequency difference estimate detector 54. The frequency difference estimate detector 54 generates a frequency difference signal 51 which is then converted into an analog signal by a D/A converter 56. The difference frequency signal 53 is then used for automatic frequency control.

The RSSI signal 28 is supplied to a third A/D converter 58 which operates at the same sampling rate as the rate from the clock 60 supplied to the first and second A/D converters 48a and 48b respectively. The first, second, and third A/D converters 47a, 47b and 58 respectively are sampled by a clock signal from the clock 60 at greater than equal to twice the expected symbol rate. The digitized RSSI signal 57, comprising m bits which is the output of the third A/D converter 58, can be used to adjust the clock 60. In addition, the digitized log RSSI signal 57 is supplied to a log to linear converter 62 which converts the digitized RSSI signal 57 back to a linear digital RSSI signal 59. The linear digitized RSSI signal 59 is then scaled by a scaling circuit 54, if needed, generating a scaled digitized RSSI signal 61. The scaled digitized RSSI signal 61 is supplied to a multiplier 66 to which the complex baseband signal S$_4$(t) 49 is also supplied and is combined in the following manner:

$$S_5(t) = S_4(t) \times RSSI$$

To form the linear complex baseband signal 68.

The converter 40 as described hereinabove and as shown in FIG. 4 can be used in the receiver 10 shown in FIG. 1 or in each of the channels in the receiver 110 showing FIG. 2.

Figure 5:
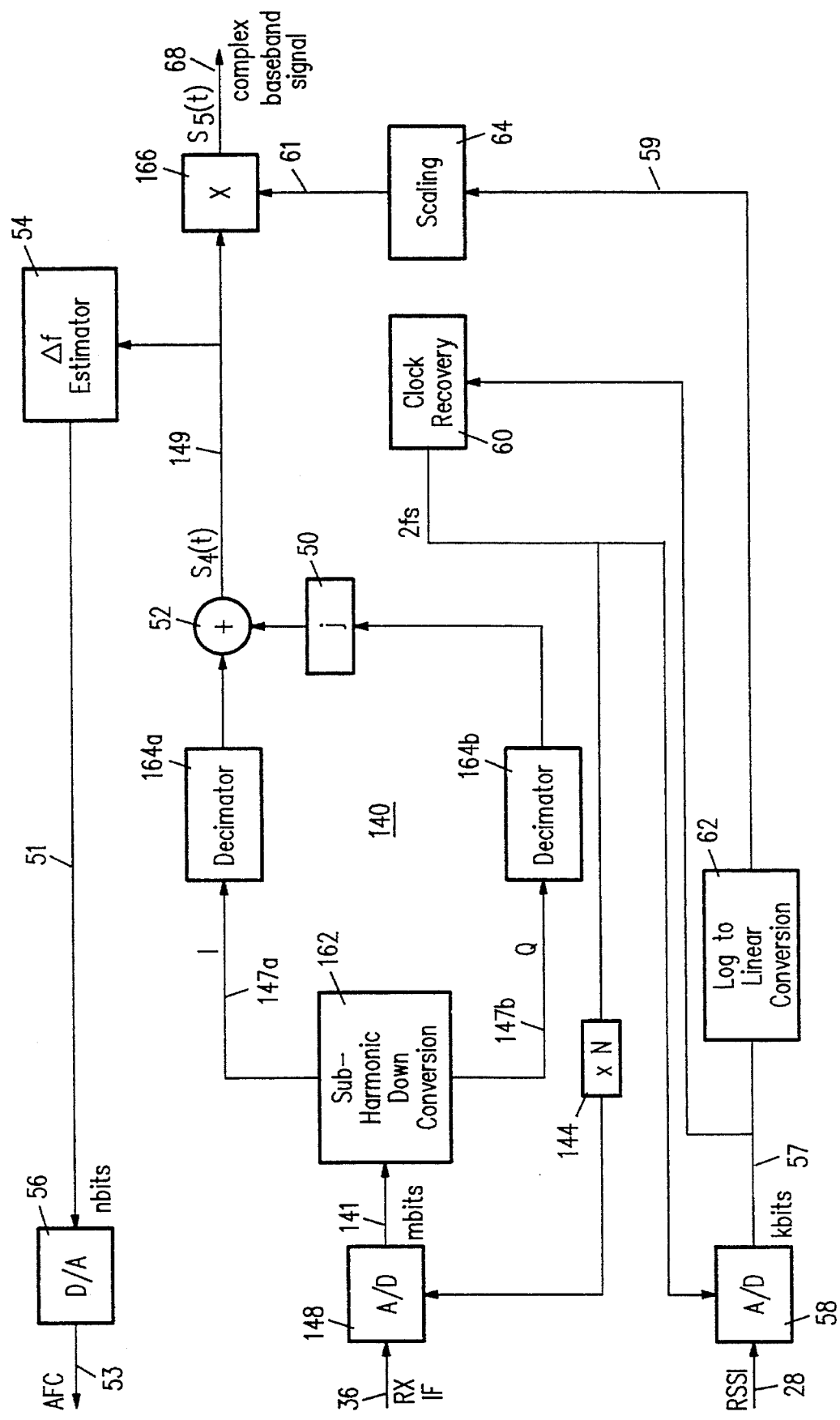
FIG. 5 is a detailed block diagram of another embodiment of a bandpass to complex low pass converter which can be used in the receivers shown in FIGS. 1 and 2.
Figure 6:
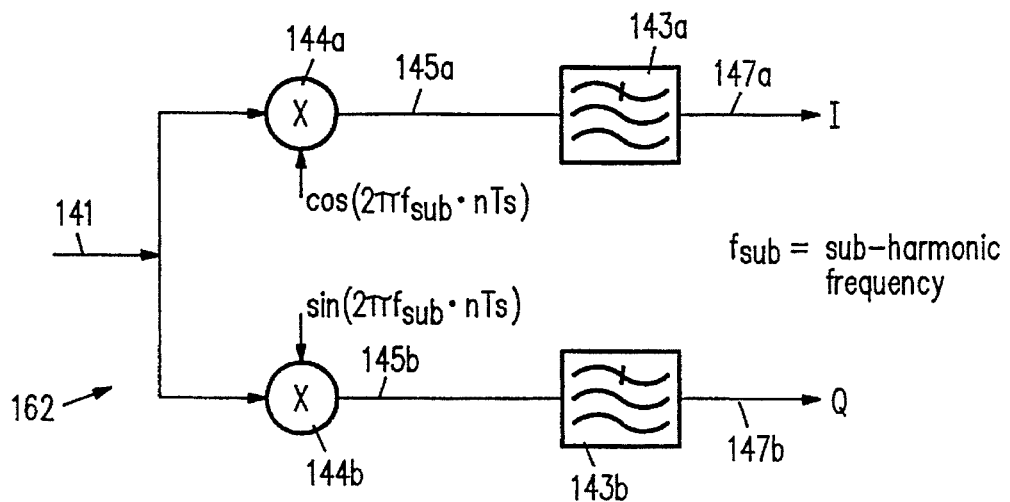
FIG. 6 is a detailed block diagram of the sub-harmonic down conversion portion of the circuit for the embodiment of the bandpass to complex low pass converter shown in FIG. 5.

Referring to FIG. 5 there is shown another embodiment of a converter 140 which can be used in the receiver 10 shown in FIG. 1 or each of the two channels of the receiver 110 shown in FIG. 2. The converter 140 shown in FIG. 5 is similar to the converter 40 shown in FIG. 4 having many of the same components. The IF signal 36, received by the converter 140, is converted into a digital signal by a first A/D converter 148. The first A/D converter 148, however, receives a clock signal from the clock 60, increased by a multiplier 144. The result is that the clock signal supplied to the A/D converter 148 samples the IF signal 36 at a rate at least 4 times the symbol rate. The rate of at least four times the symbol rate is chosen depending upon the bandwidth and the frequency of the IF signal 36. The result is a digitized IF signal 141, which is supplied to a sub-harmonic down converter 162, which is shown in FIG. 6 and will be explained in greater detail hereinafter. The digitized IF signal 141, in digital format, is down converted (rather than demodulated, as in the case of an analog IF signal, in FIG. 4) to produce the baseband I and Q signals 147a and 147b, respectively. Each of the baseband signals I and Q, 147a and 147b respectively is applied to a decimator 164a and 164b, respectively, which performs the function of decimation, which decreases the number of samples per symbol. Lowering the number of samples per symbol decreases the processing power required. Decimation is not needed if the number of samples per symbol is the minimum required for correct processing of the signal. The output of the second decimator 164b, the real Q baseband signal is converted into an imaginary vector signal by the imaginary vector 50. The resultant signal jQ(t) from the vector 50, is supplied to an adder 52 to which the I real baseband signal has also been supplied. The output of the adder 52 is the complex baseband signal $S_4(t)$ 149 which is as follows:

$$S_4(t) = I(t) + jQ(t) \quad I^2(t) + Q^2(t) = \text{constant}$$

The complex baseband signal 149 is then supplied to a multiplier 166.

The complex baseband signal 149 is also supplied to a difference frequency estimate detector 54, which produces an output signal 51 which is supplied to a D/A converter 56 which generates the difference frequency 53 used for automatic frequency control, all similar to that described in FIG. 4.

The RSSI signal 28 is supplied to a second A/D converter 58 which is sampled at a sampling rate set by the clock 60. The sampling rate is greater than twice the symbol rate and therefore can be slower than the rate of sampling of the A/D converter 148. The output of the second A/D converter is a digitized RSSI signal 57. The digitized RSSI signal 57, similar to the digitized RSSI signal 57 shown in FIG. 4, can be used to control the clock 60. In addition, the digitized log RSSI signal 57 is converted back to linear format by the log to linear converter 62. The resultant linear digitized RSSI signal 59 is then supplied to a scaler 64, again, if needed. Finally, the scaled, linear, digitized RSSI signal 61 is then supplied to the multiplier 166 which generates the output complex baseband signal 68.

Similar to the description for FIG. 4, since the amplitude limited IF signal 36 contains only the phase of the modulating signal and does not carry any amplitude information, in order to reconstruct the complex baseband signal 68, the envelope information of the modulating signal which is contained in the RSSI signal 28 is used to restore the envelope information of the complex baseband signal 68. Furthermore, with the embodiment of the converter 140 shown in FIG. 5, the converter 140 is less complex than the converter 40 shown in FIG. 4. Thus, it is more suitable for integration. In addition, it eliminates some of the problems inherent with quadrature demodulators used in the embodiment of the converter 40 shown in FIG. 4. Finally, gain and phase imbalance, DC offset, and carrier feed through are some of the other problems which can be avoided by sampling and digitizing the modulated IF signal 28, rather than the demodulated baseband signals.

Referring to FIG. 6, there is shown one embodiment of the down converter 162 used in the converter 140. The sampled digitized IF signal 141 is supplied to a first multiplier 144a and a second multiplier 144b simultaneously. Each of the first and second multipliers 144a and 144b operates in the signal provided as follows:

signal 145a = Signal 141*Cos ($2\pi f_{sub}*t$)

signal 145b = Signal 141*Sin ($2\pi f_{sub}*t$)

where $f_{sub}$ is the sub-harmonic frequency, t=nTs, where Ts is the sampling period, and n is determined by the periodicity of:

$$f_{sub}*nTs = 1; \text{ or } n = 1/(f_{sub}*Ts)$$

Each of the outputs of the multipliers 144a and 144b is then passed through a low pass filter 143a, and 143b, respectively, to form the baseband signals I nd Q 147a and 147b, respectively.

With respect to the receiver 10, shown in FIG. 1, the complex baseband signal 68 is received by an equalizer 70. The equalizer 70 is of conventional design and is well known in the art and serves to remove any intersymbol interference, when the channel is experiencing delay dispersion. The equalizer 70 needs both the amplitude and the phase information of the complex baseband signal 68 to estimate the channel and to compensate for the dispersion. Thus, the complex baseband signal 68 is provided with the phase information by the output of the adder 52 ($S_4(t) = I(t) + jQ(t)$) and by the amplitude from the RSSI signal 36, in both the embodiments of the converter 40 and 140 shown in FIGS. 4 and 5. In both embodiments of the receiver 10 and 110, the output of the IF limiting amplifier 20 is an IF signal having a limit in its amplitude, thereby removing the envelope information. The envelope information, however, is contained in the RSSI signal and is restored when the digitized complex baseband signal $S_4(t)$ (49 or 149) is multiplied by the RSSI signal. Once the equalizer 70 has operated upon the complex baseband signal 68, the equalized baseband signal 72 is then supplied to a symbol detector 80.

Figure 7:
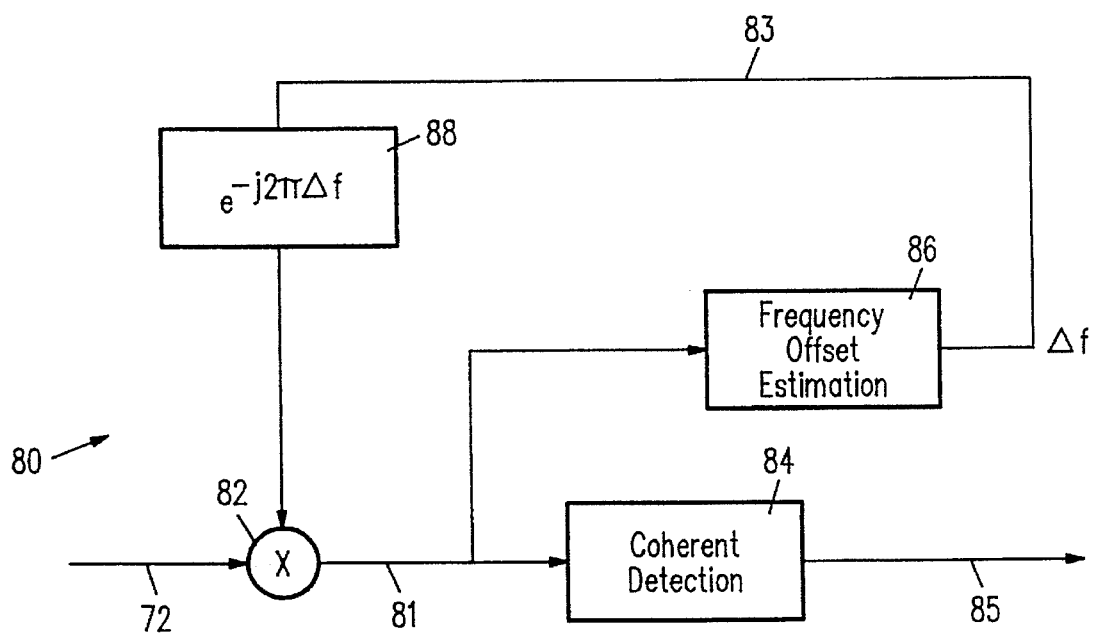
FIG. 7 is a detailed block diagram of the symbol detector which can be used in the receivers shown in FIGS. 1 and 2.

Referring to FIG. 7 there is shown one embodiment of a symbol detector 80. The equalized complex baseband signal 72 from the equalizer 70 or the diversity combiner 90 is supplied to a multiplier 82 to which a signal $e^{-j2\pi\Delta f}$ is supplied from the circuit 88. This multiplication removes any frequency offset from the complex baseband signal 72. The result is a complex baseband signal 81 whose frequency offset has been removed. This signal 81 is then supplied to a frequency offset estimation circuit 86 which generates a frequency differential signal 83 or $\Delta f$. The frequency differential signal 83 $\Delta f$ is supplied to the circuit 88 which generates the signal $e^{-j2\pi\Delta f}$. In addition the signal 81 is supplied to a coherent detector 84. The coherent detector 84 detects the symbols in the signal 81 coherently. The result of the output of the symbol detector 80 is data symbols or bits.

For the receiver 110 having space diversity, the two complex baseband signals 68a and 68b which are the outputs of the bandpass converters 40a and 40b are supplied to a diversity combiner 90. The diversity combiner 90 can be of conventional design serving to overcome flat fading. This can be diversity combining of equal gain, post-detection selection, co-phasing with and without signal-to-noise ratio weighting and switch diversity.

In the preferred embodiment, the foregoing description is implemented by a digital signal processor executing appropriate software. In addition, the receiver 10 or 110 can be used to detect both analog FM and digital modulation formats such as FSK, CPFSK, and DPSK.

What is claimed is:

1. A telecommunication receiver for receiving a wireless transmitted electromagnetic signal, said receiver comprising:

antenna means for receiving said wireless transmitted electromagnetic signal and for converting same to a radio frequency (RF) signal;

means for converting said RF signal into an intermediate frequency (IF) signal, having an amplitude; and for limiting said amplitude and for generating a receive signal strength intensity (RSSI) signal;

bandpass converting means for receiving said amplitude limited IF signal and said RSSI signal; said converting means comprising:

means for converting said amplitude limited IF signal to a plurality of baseband signals;

means for digitizing each of said plurality of baseband signals at a sampling rate to produce a plurality of digitized baseband signals;

means for combining said plurality of digitized baseband signals to produce a complex signal S(t) in accordance with $$S(t)=I(t)+jQ(t) \text{ where } I^2(t)+Q^2(t)=\text{constant}$$

where I,Q are said plurality of digitized baseband signals;

means for digitizing said RSSI signal at said same sampling rate, to produce a digitized RSSI signal;

means for multiplying said digitized RSSI signal with said complex signal to produce a complex baseband signal;

means for equalizing said complex baseband signal by removing intersymbol interference; and means for detecting symbols in said equalized complex baseband signal.

2. A telecommunication receiver for receiving a wireless transmitted electromagnetic signal, said receiver comprising:

antenna means for receiving said wireless transmitted electromagnetic signal and for converting same to a radio frequency (RF) signal;

means for converting said RF signal into an intermediate frequency (IF) signal, having an amplitude; and for limiting said amplitude and for generating a receive signal strength intensity (RSSI) signal;

bandpass converting means for receiving said amplitude limited IF signal and said RSSI signal, said converting means comprising:

means for digitizing said amplitude limited IF signal at a first sampling rate to produce a digitized IF signal;

means for converting said digitized IF signal to a plurality of digitized baseband signals;

means for combining said plurality of digitized baseband signals to produce a complex signal S(t) in accordance with $$S(t)=I(t)+jQ(t) \text{ where } I^2(t)+Q^2(t)=\text{constant}$$

where I,Q are said plurality of digitized baseband signals;

means for digitizing said RSSI signal, at a second sampling rate, to produce a digitized RSSI signal;

means for multiplying said digitized RSSI signal with said complex signal to produce a complex baseband signal;

means for equalizing said complex baseband signal by removing intersymbol interference; and means for detecting symbols in said equalized complex baseband signal.

3. The receiver of claim 2 wherein said first sampling rate is four times the second sampling rate.

4. A telecommunication receiver for receiving a wireless transmitted electromagnetic signal, said receiver comprising:

a plurality of spaced apart antenna means for receiving said wireless transmitted electromagnetic signal and for converting same to a plurality of radio frequency (RF) signals;

a plurality of means for converting said plurality of RF signals into a plurality of intermediate frequency (IF) signals each having an amplitude and for limiting the amplitude of each IF signal and for generating a receive signal strength intensity (RSSI) signal associated with each IF signal;

bandpass converting means for receiving said plurality of IF signals, and the RSSI signal associated with each IF signal, said converting means comprising:

means for converting each IF signal into a plurality of baseband signals;

means for digitizing each of said plurality of baseband signals of each IF signal at a sampling rate to produce a plurality of digitized baseband signals;

means for combining said plurality of digitized baseband signals for each IF signal to produce a complex signal S(t) in accordance with $$S(t)=I(t)+jQ(t) \text{ where } I^2(t)+Q^2(t)=\text{constant}$$

where I,Q are said plurality of digitized baseband signals for each IF signal;

means for digitizing each of said RSSI signal associated with each IF signal, at said same sampling rate, to produce a digitized RSSI signal;

means for multiplying each of said digitized RSSI signal with its associated complex signal to produce a complex baseband signal;

means for combining said complex baseband signals into a symbol signal; and means for detecting symbols in said symbol signal.

5. A telecommunication receiver for receiving a wireless transmitted electromagnetic signal, said receiver comprising:

a plurality of spaced apart antenna means for receiving said wireless transmitted electromagnetic signal and for converting same to a plurality of radio frequency (RF) signals;

a plurality of means for converting said plurality of RF signals into a plurality of intermediate frequency (IF) signals each having an amplitude and for limiting the amplitude of each IF signal and for generating a receive signal strength intensity (RSSI) signal associated with each IF signal;

bandpass converting means for receiving said plurality of IF signals, and the RSSI signal associated with each IF signal; said converting means comprising:

means for digitizing each IF signal at a first sampling rate to produce a digitized IF signal;

means for converting each digitized IF signal into a plurality of digitized baseband signals;

means for combining each of said plurality of digitized baseband signals associated with each IF signal to produce a complex signal S(t) in accordance with $$S(t)=I(t)+jQ(t) \text{ where } I^2(t)+Q^2(t)=\text{constant}$$

where I,Q are said plurality of digitized baseband signals for each IF signal;

means for digitizing each RSSI signal at a second sampling rate, lower than said first sampling rate, to produce a digitized RSSI signal;

means for multiplying each of said digitized RSSI signal with its associated complex signal to produce a complex baseband signal;

means for combining said complex baseband signals into a symbol signal; and means for detecting symbols in said symbol signal.

6. The receiver of claim 5 wherein said first sampling rate is four times the second sampling rate.

7. A method of detecting symbol signals in a wireless transmitted electromagnetic signal, said method comprising:

receiving said wireless transmitted electromagnetic signal and converting same to radio frequency (RF) signal;

converting said RF signal into an intermediate frequency (IF) signal, having an envelope and an amplitude;

limiting the amplitude of said IF signal to produce an amplitude limited IF signal;

detecting the envelope of the IF signal to generate a receive signal strength intensity (RSSI) signal;

generating a digitized baseband signal containing only the phase of said IF signal from said amplitude limited IF signal;

processing said digitized baseband signal by said RSSI signal to generate a complex baseband signal having the envelope of said IF signal;

equalizing said complex baseband signal by removing intersymbol interference; and detecting symbols in said equalized complex baseband signal.

8. The method of claim 7 wherein said generating step further comprises:

converting said limited IF signal to a plurality of baseband signals;

digitizing said plurality of baseband signals at a sampling rate to produce a plurality of digitized baseband signals;

combining said plurality of digitized baseband signals to produce a complex signal S(t), in accordance with $$S(t)=I(t)+jQ(t) \text{ where } I^2(t)+Q^2(t)=\text{constant}$$

where I,Q are said plurality of baseband signals;

digitizing said RSSI signal, at the same sampling rate to produce a digitized RSSI signal.

9. The method of claim 7 wherein said generating step further comprises:

digitizing said amplitude limited IF signal at a first sampling rate to produce a digitized IF signal;

converting said digitized IF signal into a plurality of digitized baseband signals;

combining said plurality of digitized baseband signals to produce a complex signal S(t), in accordance with $$S(t)=I(t)+jQ(t) \text{ where } I^2(t)+Q^2(t)=\text{constant}$$

where I,Q are a plurality of digitized baseband signals;

digitizing said RSSI signal at a second sampling rate to produce a digitized RSSI signal.

10. The method of claim 9 wherein said first sampling rate is four times said second sampling rate.

* * * * *